Feb. 18, 1958 D. D. STELLMACHER 2,824,238
RADIATION DETECTION PULSE TRANSLATING CIRCUIT
Filed Oct. 3, 1955
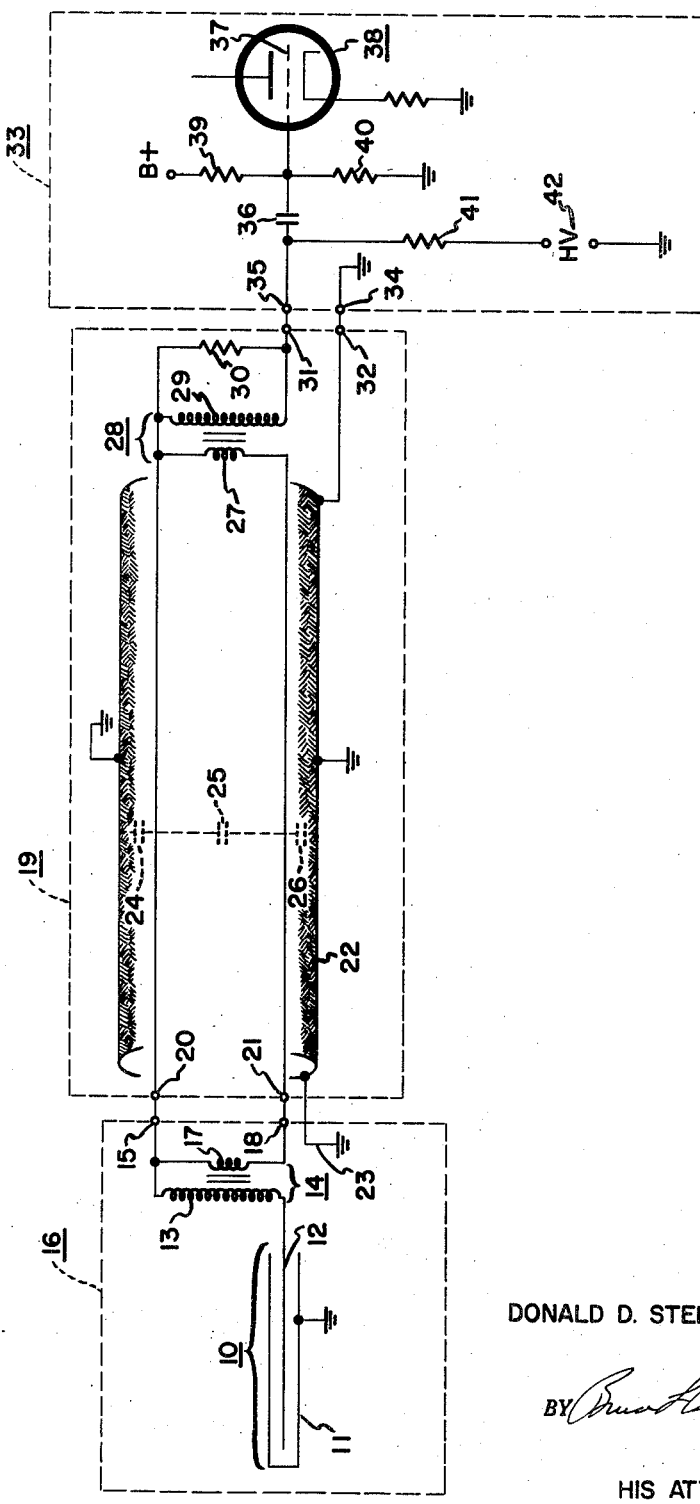
DONALD D. STELLMACHER
INVENTOR.
BY
HIS ATTORNEY United States Patent Office 2,824,238
Patented Feb. 18, 1958

2,824,238

RADIATION DETECTION PULSE TRANSLATING CIRCUIT

Donald D. Stellmacher, Los Angeles, Calif., assignor to Hoffman Electronics Corporation, a corporation of California Application October 3, 1955, Serial No. 538,208

6 Claims. (Cl. 250—83.6)

This invention is related to pulse translating circuits associated with deep hole, radiation detection probes and, more particularly, to a new and improved pulse translating circuit exhibiting a low insertion loss.

In the past, many types of translating circuits for intercoupling a radiation detection probe to a remotely located electrical circuit associated therewith have been devised. Current designs of deep hole probe translating circuits include step-down and step-up transformers intercoupled low-impedancewise and each transformer having its windings grounded at one end to the shield of the translating circuit cable. The low-impedance coupling of the pulse transformers at either end of the translating cable does tend to reducce the shorting out effect of the rather high, shield-to-transmission line capacitance. However, some attenuation of pulse signals will inevitably occur along the transmission line. Moreover, by virtue of the fact that the Geiger tube probe itself requires a high D. C. operating voltage, e. g., in the neighborhood of 1,000 volts, a large D. C. decoupling capacitor must be employed in conjunction with the voltage pulse producing resistor generally employed with the probe. It would, of course, be desirable to eliminate the necessity of employing a resistor and physically large capacitor with the Geiger tube probe, and to reduce as much as possible the attenuation of pulse energies along the coupling circuit.

Therefore, it is an object of the present invention to provide a new and useful pulse translating circuit for deep hole, radiation detection probes.

It is a further object of the present invention to reduce the attenuation of pulse energies by the translating circuit.

It is an additional object of the present invention to provide a new and useful pulse translating circuit which will preclude the necessity for employing a pulse voltage developing resistor and physically large decoupling capacitor within the probe itself.

According to the present invention, first and second pulse transformers at either end of the translating circuit transmission line are low-impedance coupled by two separate wires, thereby reducing the shunting capacitive reactance across the intercoupled transformer windings to the interwire capacitance alone. One of the wires also constitutes the high voltage lead and is coupled through the input winding of the first pulse transformer to the Geiger tube center electrode, the Geiger tube chamber itself being connected directly to ground, thereby eliminating the requirement for the R–C combination normally associated with a Geiger tube. The input winding of the first pulse transformer, itself, produces voltage pulses for translation to the electrical circuit associated with the probe during the ionization intervals of the Geiger tube. The output winding of the second pulse transformer is directly coupled to the high voltage supply of the electrical circuit associated with the Geiger tube probe, and also to the input circuit of a pulse responsive multivibrator.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which:

The sole figure is a schematic diagram of a pulse translating circuit for deep hole, radiation detection probes according to the present invention including also a portion of an electrical unit associated with the probe, the circuitry of which is given purely by way of example, for the purpose of showing the possible electrical connection of the translating circuit to an associated electrical unit.

In the sole figure, Geiger tube 10 includes housing 11, which is coupled directly to ground, and center electrode 12, which is coupled through primary winding 13 of pulse transformer 14 to terminal 15 of probe unit 16. Secondary winding 17 of pulse transformer 14 is coupled at either end to terminals 15 and 18, respectively. Transmission circuit 19 is provided with input terminals 20 and 21 which are respectively coupled to terminals 15 and 18 by means of a conventional plug receptacle. Or, if it is desired to have as a single unit the combination of probe unit 16 and transmission circuit 19, then terminals 15, 18, 20 and 21 will be unnecessary and in lieu thereof a simple straight wire connection to each of the two leads will be employed. If on the other hand it is desirable to have two separate units, i. e., probe unit 16 and transmission circuit 19 constitute the complete pulse translation circuit, then outer shield 22 of transmission circuit 19 may be coupled through the receptacle plug or a pin connection thereof to the ground of probe unit 16, as indicated by lead 23 connecting to ground. Of interest are shield-to-wire capacitance 24, wire-to-wire capacitance 25, and shield-to-wire capacitance 26 the effect of which will be mentioned in detail later. Terminals 20 and 21 are coupled across primary winding 27 of pulse transformer 28. Terminal 20 is also coupled through secondary winding 29 of transformer 28 and also through parallel combined resistor 30 to transmission circuit output terminal 31. And, since conventional input plug receptacles for Geiger counters have two pins, grounded shield 22 may be coupled to output terminal 32, as shown. If on the other hand there is a simple coaxial line connection to Geiger counter unit 33, then a single input lead will suffice and shield 22 will be coupled through the plug receptacle itself to the ground of unit 33. The input circuit of a conventional Geiger counter is given in the sole figure (within unit 33) purely by way of example. Input terminal 34 is grounded. Input terminal 35 is coupled through D. C. blocking capacitor 36 to control electrode 37 of vacuum tube 38. The voltage divider combination of resistors 39 and 40 is conventional and plays no part in the present invention. Of interest, however, and which will be hereinafter explained is the inclusion of the combination of resistor 41 in series with high voltage supply 42, which is coupled between input terminal 35 and ground.

The circuit shown in the sole figure operates as follows. Radiation penetrations of the ionization chamber of Geiger-Müller tube 10 produce successive discharges between high voltage center electrode 12 and housing 11. These successive discharges will produce pulses across primary winding 13 of pulse transformer 14, which pulses are translated through low-impedance coupled windings 17 and 27 to output winding 29 of transformer 28. The effect of the low impedance of windings 17 and 27 is to reduce to a minimum the shorting effect of interwire capacitance. Wire-to-shield capacitance 26 will not affect the slight attenuation of the pulse signal exhibited along transmission circuit 19. Wire-to-shield capacitance 24 will have a desirable effect upon the circuit, as shall be hereinafter explained. Pulses are stepped up by transformer 28 and appear as large voltage pulses across output winding 2. Output terminals 31 and 32, again, are coupled to a source of high D. C. voltage as is shown. It is to be noted that high voltage supply 42 within Geiger counter unit 33 is coupled to central electrode 12 of Geiger-Müller tube 10 through the series connected combination of resistor 41, the parallel combination of winding 29 and resistor 30, and winding 13 of transformer 14. Wire-to-shield capacitance 24 in effect places the combination of winding 29 and resistor 30 between terminal 35 and A. C. ground so that the signal developed thereacross will also appear across resistor 41 which leads to the input of vacuum tube 38. Resistor 30 is in effect a damping resistor to prevent excessive ringing by the winding 29-capacitance 24 combination which might otherwise impress an undesirable ringing signal upon control electrode 37 of vacuum tube 38.

The advantages of the circuit shown in the sole figure and above described reside in the features that no large capacitor and signal developing resistor need be employed with the Geiger-Müller tube probe, the high D. C. voltage is supplied the Geiger-Müller tube by a lead common with the low-impedance intercoupling of the pulse transformers, and the novel circuitry by which the wire-to-shield capacitance of the transmission cable is effectively placed in series between ground and the signal developing output winding of the output pulse transformer so as to impress the output signal across the input circuit of an associated tube in the attached Geiger counter unit.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In combination, a radiation detection device having a housing adapted for direct coupling to a common reference potential and a central electrode; first and second transformers each having a primary winding and a secondary winding, each of said windings being provided with first and second end terminals; a first wire high voltage lead intercoupling all of said first terminals of said windings; said second end terminal of said first transformer primary winding being coupled to said central electrode of said radiation detection device; a second wire lead intercoupling said second end terminal of said first transformer secondary winding and said second end terminal of said second transformer primary winding; a shield surrounding said wire leads and maintained at said common reference potential; a first output terminal coupled to said second end terminal of said second transformer secondary winding; and a second output terminal maintained at said common reference potential, said first and second output terminals being adapted for coupling to a circuit providing a high D. C. potential.

2. Apparatus according to claim 1 in which a first resistor is coupled across said secondary winding of said second transformer.

3. Apparatus according to claim 1 in which a series connected second resistor-high D. C. voltage source combination is coupled across said first and second output terminals.

4. Apparatus according to claim 2 in which a series connected second resistor-high D. C. voltage source combination is coupled across said first and second output terminals.

5. Apparatus according to claim 3 in which a vacuum tube stage has an input circuit coupled across said resistor-high voltage source combination.

6. In combination, a radiation detection device having a housing adapted for direct coupling to a common reference potential and a central electrode; first and second transformers each having a primary winding and a secondary winding, each of said windings being provided with first and second end terminals, said first transformer being of the step-down type having a low impedance output, said second transformer being of the step-up type having a low impedance input; a first wire high voltage lead intercoupling all of said first terminals of said windings; said second end terminal of said first transformer primary winding being coupled to said central electrode of said radiation detection device; a second wire lead intercoupling said second end terminal of said first transformer secondary winding and said second end terminal of said second transformer primary winding; a shield surrounding said wire leads and maintained at said common reference potential; a first output terminal coupled to said second end terminal of said second transformer secondary winding; and a second output terminal maintained at said common reference potential, said first and second output terminals being adapted for coupling to a circuit providing a high D. C. potential.

References Cited in the file of this patent

UNITED STATES PATENTS

| | | |
|---|---|---|
| 2,298,794 | Howell | Oct. 13, 1942 |
| 2,316,361 | Piety | Apr. 13, 1943 |